United States Patent [19]

Cherng

[11] Patent Number: 5,752,560
[45] Date of Patent: May 19, 1998

[54] ELECTRIC SUNSHIELD FOR AUTOMOBILES

[76] Inventor: Bing Jye Cherng, P.O. Box 82-144, Taipei, Taiwan

[21] Appl. No.: 823,308

[22] Filed: Mar. 21, 1997

[51] Int. Cl.$^6$ ............................................. B60J 3/00
[52] U.S. Cl. ................ 160/370.22; 160/22; 160/70
[58] Field of Search .................... 160/370.22, 23.1, 160/24, 22, 66, 68, 70, 79, 265, 310, DIG. 2, DIG. 3, DIG. 4; 296/97.7, 97.8, 141, 142, 143

[56] References Cited

U.S. PATENT DOCUMENTS

| | | | |
|---|---|---|---|
| 4,836,263 | 6/1989 | Ament | 160/370.22 X |
| 5,076,633 | 12/1991 | Hsu et al. | 160/370.22 X |
| 5,284,198 | 2/1994 | Kauka | 160/370.22 X |
| 5,291,934 | 3/1994 | Ouvrard et al. | 160/370.22 X |
| 5,468,040 | 11/1995 | Hsieh et al. | 160/370.22 X |
| 5,615,729 | 4/1997 | Matsumoto et al. | 160/370.22 |
| 5,638,884 | 6/1997 | Lin | 160/370.22 |
| 5,653,278 | 8/1997 | Cheng | 160/370.22 |

*Primary Examiner*—David M. Purol
*Attorney, Agent, or Firm*—A & J

[57] ABSTRACT

An electric sunshield for automobiles includes a tubular member formed with a longitudinal slot, a pair of retainer rings each engaged with a respective end of the tubular member and each provided with a L-shaped lug, a transmission axle fitted within the tubular member and having an end provided a worm gear, a curtain rolled on the transmission axle and having an end extending out of the longitudinal slot of the tubular member to engage with an elongated rod member, a pair of hollow end covers engaged with respective ends of the tubular member to receive the worm gear and fixedly kept in place by the retainer rings, a motor arranged within one of the hollow end covers and provided with an output worm rod meshed with the worm gear of the transmission axle, a pair of connectors each including a male member, a female member and a spring, and a pair of collapsible arms each mounted between the female member of a respective one of the connectors and an end of the elongated rod member.

1 Claim, 5 Drawing Sheets

ELECTRIC SUNSHIELD FOR AUTOMOBILES

BACKGROUND OF THE INVENTION

1. Field of the Invention

This invention is related to a sunshield and in particular to an improved electric sunshield especially designed for use in automobiles.

2. Description of the Prior Art

As shown in FIG. 1, the conventional electric sunshield for automobiles comprises a tubular member 1, a motor 11 mounted at the intermediate portion of the tubular member 1, a pair of screw rods 12 connected with two ends of the motor 11, a pair of threaded sleeves 13, engaged with the two screw rods 12, a pair of supporting rods 14 connected with the two threaded sleeves 13, a transverse rod 22 connected between the upper ends of the two supporting rods 14, a hollow cylindrical member 2 receiving the tubular member 1, a pair of clamps 15 mounted on two ends of the hollow cylindrical member 2 and provided with suction cups for engaging with the window pane of an automobile, and a roll of curtain 21 disposed within the hollow cylindrical member 2 and having an end extending out of a slot of the hollow cylindrical member 2 to engage with the transverse rod 22. However, as the motor 11 is arranged between the two screw rods 12, it will be difficult for the screw rods 12 to support the motor 11 for a long time. Hence, after having used for a certain period of time, the position of the motor 11 will be lowered thereby making the screw rods 12 unable to rotate smoothly and therefore hampering the operation of the sunshield.

Therefore, it is an object of the present invention to provide an improved electric sunshield for automobiles which can obviate and mitigate the above-noted drawbacks.

SUMMARY OF THE INVENTION

This invention relates an improved electric sunshield for automobiles.

It is the primary object of the present invention to provide an electric sunshield for automobiles which can be operated smoothly.

It is another object of the present invention to provide an electric sunshield for automobiles which is simple and sturdy in construction.

It is still another object of the present invention to provide an electric sunshield for automobiles which is easy and convenient to use.

It is still another object of the present invention to provide an electric sunshield for automobiles which is cheap to manufacture.

It is a further object of the present invention to provide an electric sunshield for automobiles which is durable and of a long service life.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
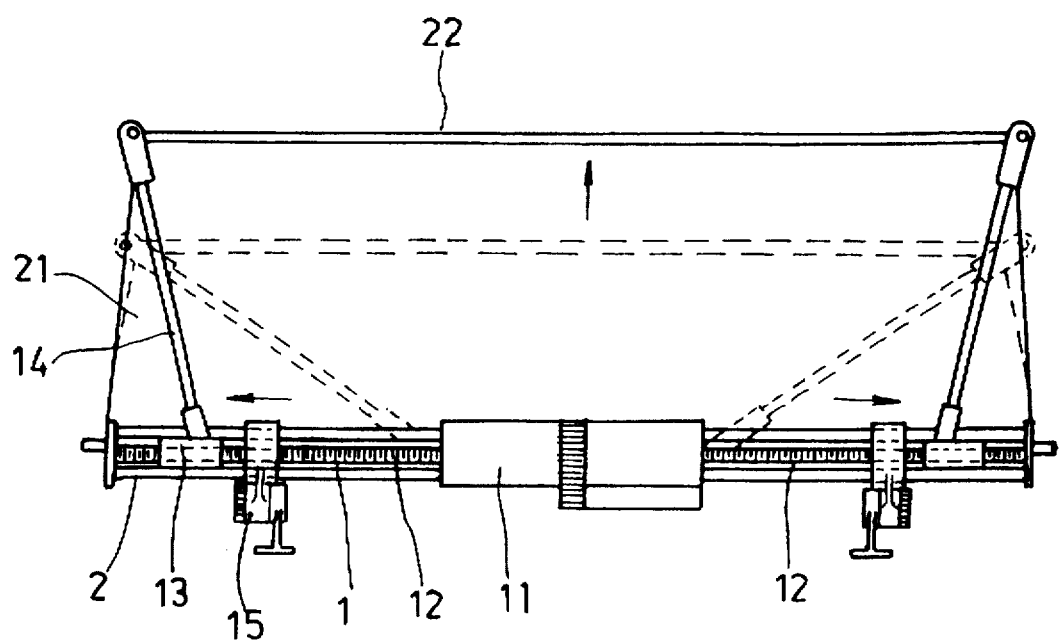
FIG. 1 illustrates a prior art electric sunshield for automobiles.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
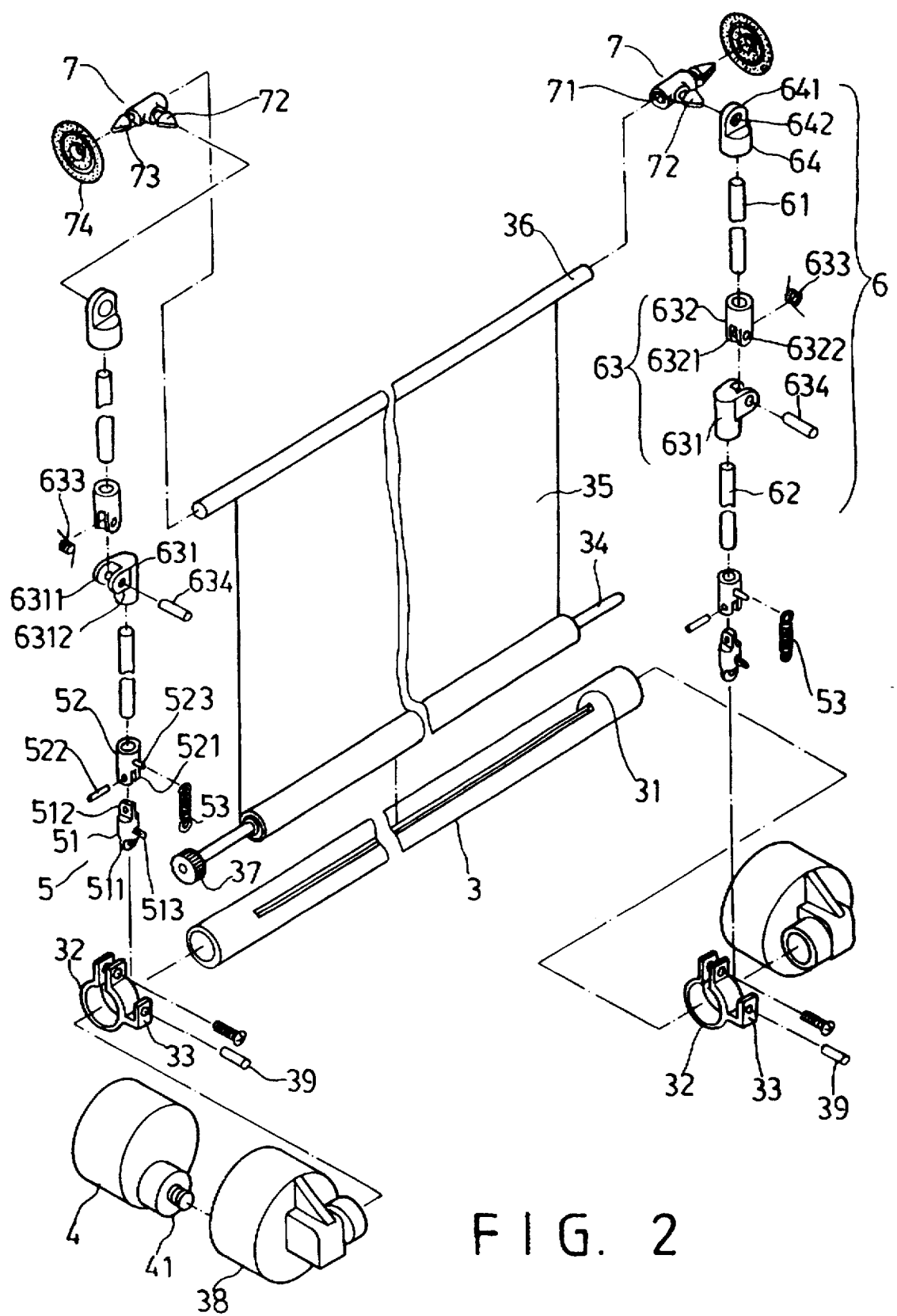
FIG. 2 is an exploded view of an electric sunshield for automobiles according to the present invention.
Figure 3:
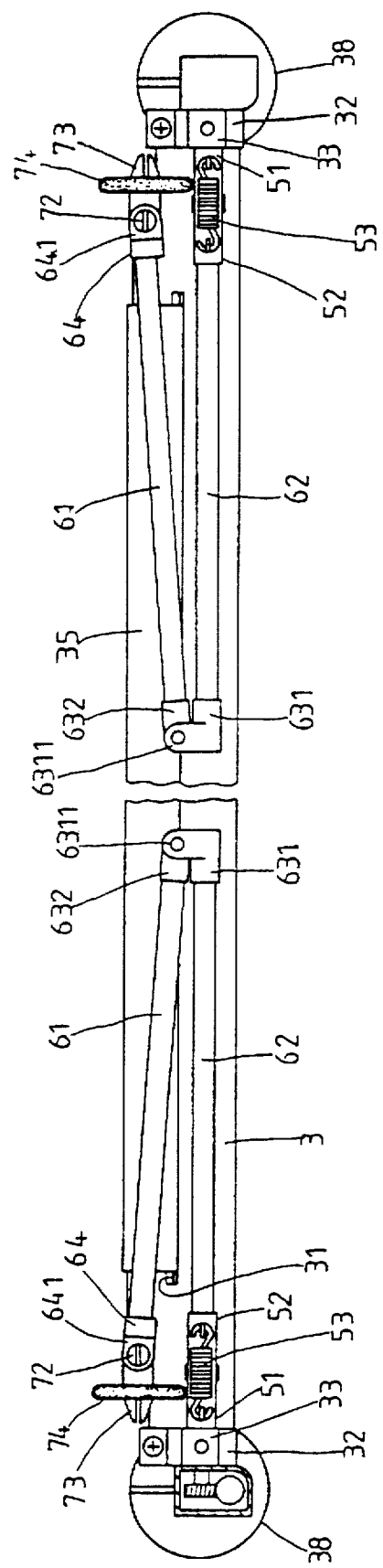
FIG. 3 illustrates the collapsed condition of the electric sunshield for automobiles according to the present invention.

With reference to the drawings and in particular to FIGS. 2 and 3 thereof, the electric sunshield for automobiles according to the present invention mainly comprises a tubular member 3, a motor 4, a pair of connectors 5, a pair of collapsible arms 6, and a pair of three-direction connectors 7.

The tubular member 3 is formed with a longitudinal slot 31 and engaged with a retainer ring 32 at both ends. The retainer ring 32 is formed with a L-shaped lug 33 extending outwardly therefrom. A transmission axle 34 is fitted within the tubular member 3 and has a curtain 35 rolled on the transmission axle 34. The curtain 35 has an end extending out of the longitudinal slot 31 to connect with an elongated rod member 36. An end of the transmission axle 34 is provided with a worm gear 37. A hollow end cover 38 is engaged with each end of the tubular member 3 to receive the worm gear 37 of the transmission axle 34 and kept in place by the retainer ring 32.

The motor 4 is arranged within one hollow end cover 38 and provided with a worm rod 41 meshed with the worm gear 37 of the transmission axle 34 so that when the motor 4 is turned on, the transmission axle 34 will be rotated.

The connector 5 includes a male member 51, a female member 52, and a spring 53. The male member 51 has a first rib 511 at the lower end and a second rib 512 at the upper end which lies on a vertical plane making a right angle with the plane going through the first rib 511. The second rib 512 of the male member 51 is pivotally connected with the L-shaped lug 33 of the retainer ring 32 by a pin 39 so that the male member 51 can be rotated with respect to the retainer ring 32. The male member 51 is formed with a projection 513 having a recess at the lower side. The female member 52 is formed at the bottom with a slot 521 pivotally connected with the second rib 512 of the male member 51 by a pin 522. The female member 52 has a projection 523 formed with a recess at the upper side. The spring 53 is mounted between the recess of the projection 513 of the male member 51 and the recess of the projection 523 of the female member 52.

The collapsible arm 6 includes an upper rod 61, a lower rod 62, a joint 63 and a head 64. The lower end of the lower rod 62 is inserted into the connector 52 so that the collapsible arm 6 can be rotated with respect to the L-shaped lug 33 of the retainer ring 32. The upper rod 61 is connected to the lower rod 62 via the joint 63. The joint 63 includes a lower tubular member 631 and an upper tubular member 632. The upper end of the lower rod 61 is inserted into the lower tubular member 631. The lower tubular member 631 is formed with a pair of ears 6311 each having hole 6312. The lower end of the upper rod 61 is inserted into the upper tubular member 632. The lower end of the upper tubular member 632 has a pair of ears 6321 each having a hole 6322. A spring 633 is fitted between the two ears 6321 of the upper tubular member 632. The lower end of the upper tubular member 632 is pivotally connected with the upper end of the lower tubular member 631 by a pin 634 extending through the ears 6311 and 6321 and the spring 633. The head 64 is mounted on the upper end of the upper rod 61 and has a rib 641 at the top formed with a hole 642.

The three-direction connector 7 is formed with a hole 71 at an end adapted to receive an end of the elongated rod member 36, a first conical head 73 at another end adapted to fit into another end of the elongated rod member, and a second conical head 72 at the intermediate portion adapted to fit into the hole 642 of the head 64. The first conical head 73 of the three-direction connector 7 is engaged with a stop wheel 74 made of rubber.

Figure 4:
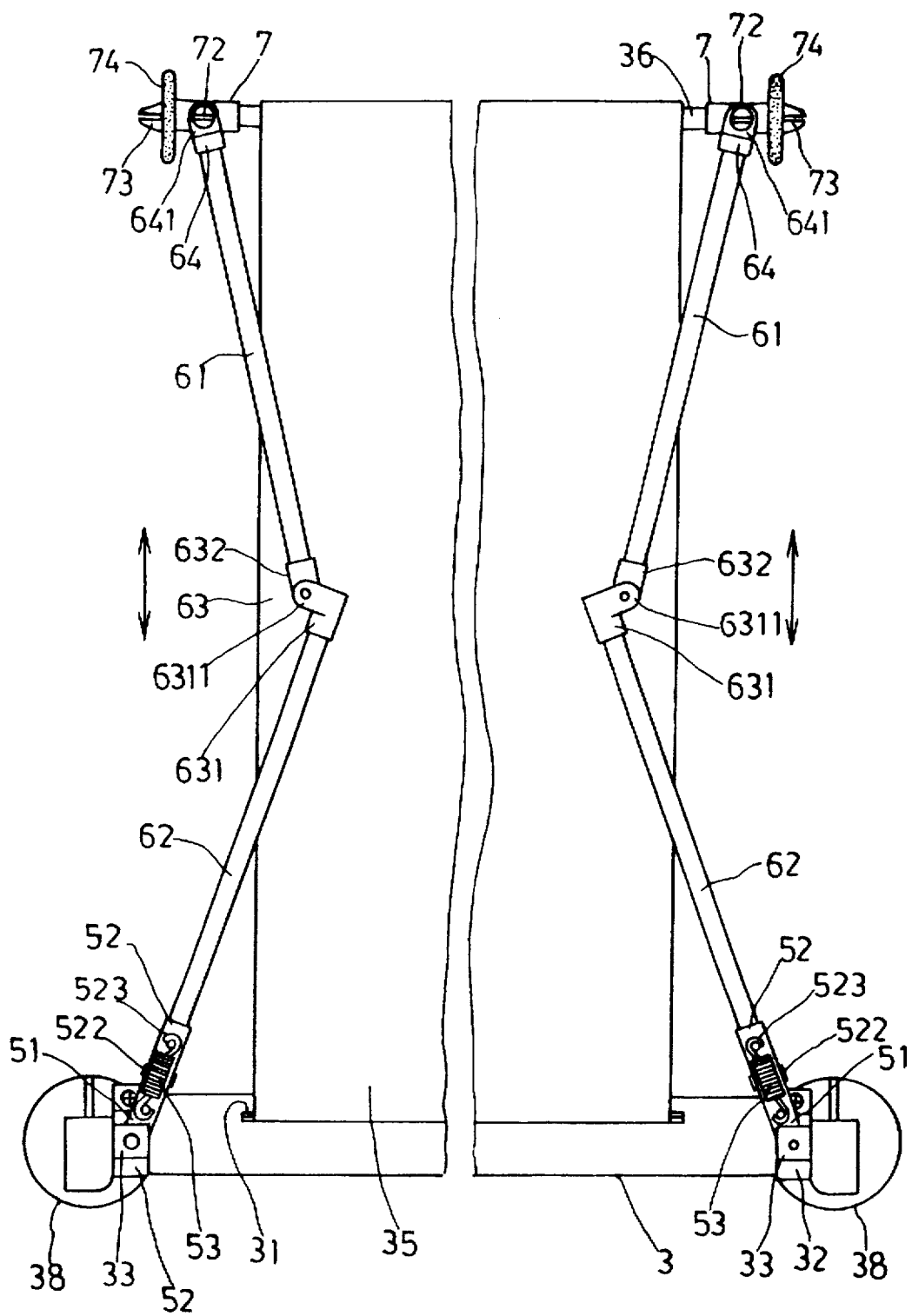
FIG. 4 is working view of the electric sunshield for automobiles according to the present invention.
Figure 5:
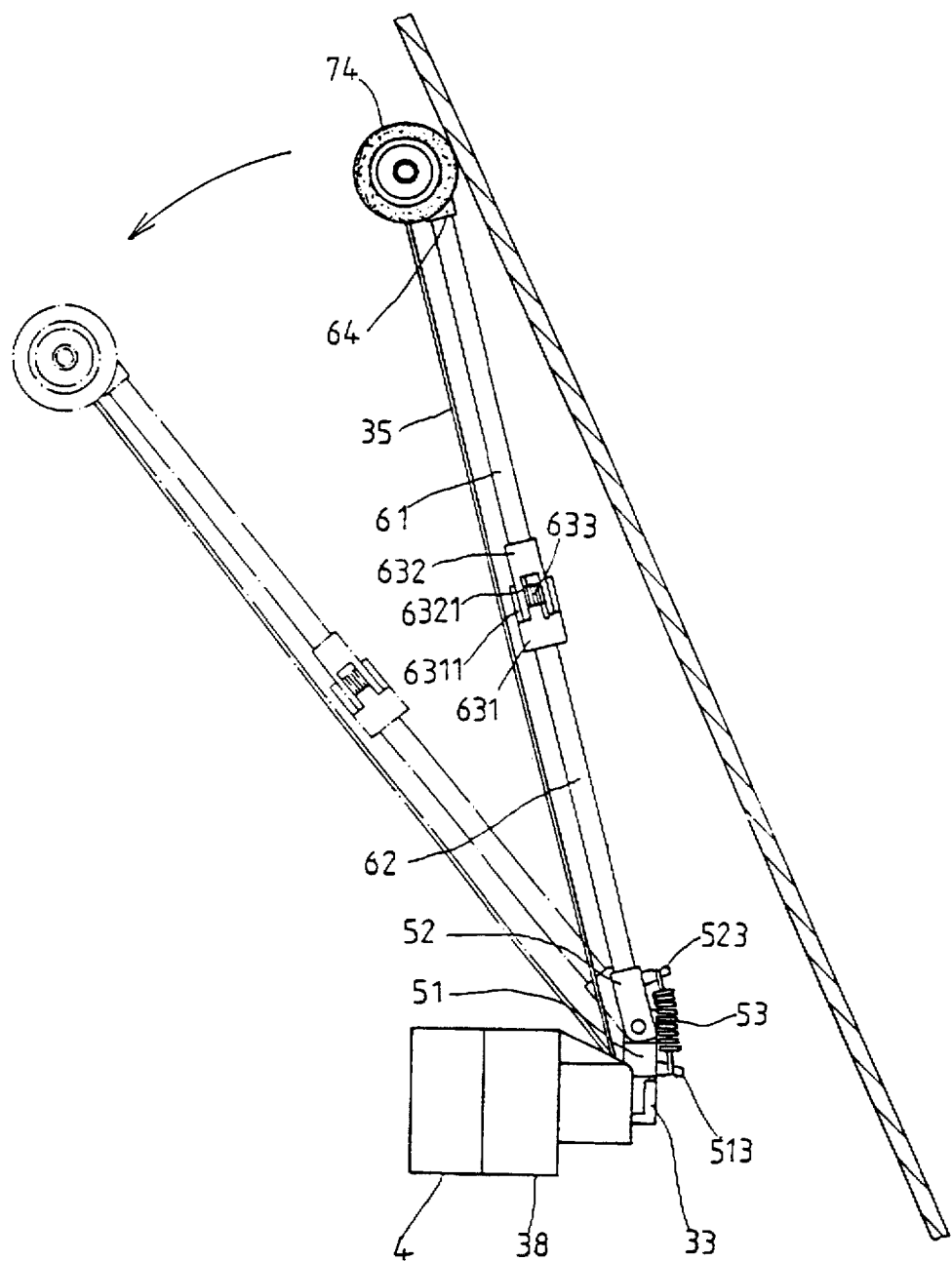
FIG. 5 is another working view of the electric sunshield for automobiles according to the present invention.

When the motor 4 is powered on, the worm rod 41 of the motor 4 will be rotated thereby rotating the worm gear 37. In the meantime, the transmission axle 34 will be rotated with the worm gear 37 thus releasing the curtain 35. Then, the springs 633 will force the upper rods 61 of the collapsible arms 6 to go upwards and so the elongated rod member 36 together with the curtain 35 will be moved upwards until the collapsible arms 6 are straightened (see FIGS. 3 and 4). Meanwhile, the motor 4 will be turned off by a switching means such as a micro-switch (not shown) or the like. The switching means may be of any design well known to those skilled in the art and is not considered a part of the invention. Furthermore, the springs 53 will pull the collapsible arms 6 to go backwards thereby causing the rubber stop wheels 74 to be in contact with the window pane (see FIG. 5). In addition, as the stop wheels 74 are made of rubber, they will not damage the window pane even if the collapsible arms 6 are pulled outwards and then released so that the stop wheels 74 are sprung back on the window pane.

As the motor 4 is turned off, the curtain 35 will be pulled back into the tubular member 3 in the reverse manner as it is released therefrom.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An electric sunshield for automobiles comprising:

a tubular member formed with a longitudinal slot;

a pair of retainer rings each engaged with a respective end of said tubular member and each provided with a L-shaped lug;

a transmission axle fitted within said tubular member and having an end provided a worm gear;

a curtain rolled on said transmission axle and having an end extending out of said longitudinal slot of said tubular member to engage with an elongated rod member;

a pair of hollow end covers engaged with respective ends of said tubular member to receive said worm gear and fixedly kept in place by said retainer rings;

a motor arranged within one of said hollow end covers and provided with an output worm rod meshed with said worm gear of said transmission axle;

a pair of connectors each including a male member, a female member and a spring, said male member having a lower end formed with a first rib and an upper end formed with a second rib which lies on a vertical plane making a right angle with a plane going through said first rib, said second rib being pivotally connected with the L-shaped lug of a respective one of said retainer rings, said spring being mounted between said male and female members; and a pair of collapsible arms each mounted between the female member of a respective one of said connectors and an end of said elongated rod member.

* * * * *